(12) United States Patent
Langlands et al.

(10) Patent No.: US 8,216,413 B2
(45) Date of Patent: *Jul. 10, 2012

(54) METHOD OF MAKING A MARINE GAS TURBINE FILTER

(75) Inventors: Derek Langlands, Cramlington (GB); Wim Fekkes, Nieuw-Amsterdam (NL)

(73) Assignee: AAF MC-Quay Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,785

(22) Filed: Mar. 9, 2011

(65) Prior Publication Data

US 2011/0154789 A1 Jun. 30, 2011

Related U.S. Application Data

(63) Continuation of application No. 12/100,699, filed on Apr. 10, 2008, now Pat. No. 7,905,974.

(60) Provisional application No. 60/953,088, filed on Jul. 31, 2007.

(51) Int. Cl.
*B01D 46/52* (2006.01)

(52) U.S. Cl. ............. 156/244.11; 55/DIG. 5; 55/502; 55/484; 156/258; 156/260; 156/275.5; 156/125; 156/140; 156/242; 156/257; 264/257; 264/264; 264/279; 264/DIG. 48

(58) Field of Classification Search .......... 55/497, 55/498, 502, DIG. 5, DIG. 12, DIG. 31; 156/244.11, 156/258, 260, 275.5, 125, 140, 242, 257; 264/257, 264, 279, DIG. 48; 425/127, 129.1
See application file for complete search history.

(56) References Cited

U.S. PATENT DOCUMENTS

| | | | |
|---|---|---|---|
| 2,423,741 A | 7/1947 | Vokes et al. | |
| 3,397,518 A | 8/1968 | Rogers | |
| 3,402,531 A | 9/1968 | Farr | |

(Continued)

FOREIGN PATENT DOCUMENTS

DE 19712477 A1 10/1998

(Continued)

OTHER PUBLICATIONS

European Patent Office, International Search Report and the Written Opinion of the International Searching Authority, or the Declaration, Search Report, Nov. 7, 2008, pp. 1-10, European Patent Office, the Netherlands.

*Primary Examiner* — Duane Smith
*Assistant Examiner* — Minh-Chau Pham
(74) *Attorney, Agent, or Firm* — Middleton Reutlinger; James E. Cole; John F. Salazar

(57) ABSTRACT

A method for making a pocket filter assembly is provided. Two side and two end header elements each having a pair of longitudinally extending side walls and a longitudinally extending bottom wall forming a longitudinally extending channel are joined at ends forming a rectangular header with two opposing sides and two opposing ends. The bottom wall and side walls of each of the opposing sides and the bottom walls and said side walls of each of said opposing ends become adjacent forming a rectangular header with a continuous bottom wall and continuous inner and outer side wall having a continuous channel therein. An upstream perimeter portion of a pocket filter element is inserted in the continuous channel and a liquid polymeric material is placed therein. The polymeric material is solidified forming a header frame having the upstream perimeter portion of the filter element unitary therewith.

14 Claims, 5 Drawing Sheets

U.S. PATENT DOCUMENTS

| | | |
|---|---|---|
| 3,486,311 A | 12/1969 | Allan, Jr. |
| 3,616,625 A | 11/1971 | Cotabish et al. |
| 3,622,446 A | 11/1971 | Burnham |
| 3,747,772 A | 7/1973 | Brown |
| 4,056,375 A | 11/1977 | Ringel et al. |
| 4,197,099 A | 4/1980 | Lundberg |
| 4,213,771 A | 7/1980 | Guibet |
| 4,300,927 A | 11/1981 | Day |
| 4,312,648 A | 1/1982 | Day |
| 4,511,380 A | 4/1985 | Fetter |
| 4,885,015 A | 12/1989 | Goulet et al. |
| 5,178,655 A | 1/1993 | Sassier |
| 5,224,974 A | 7/1993 | Johnson |
| 6,319,300 B1 | 11/2001 | Chen |
| 6,375,699 B1 | 4/2002 | Beck |
| 7,070,641 B1 | 7/2006 | Gunderson et al. |
| 7,135,052 B2 | 11/2006 | Meierhoefer et al. |
| 7,413,587 B2 | 8/2008 | Beier |
| 7,507,271 B2 | 3/2009 | Caesar |
| 2006/0107637 A1 | 5/2006 | Caesar et al. |

FOREIGN PATENT DOCUMENTS

| | | |
|---|---|---|
| EP | 0699465 A2 | 3/1996 |
| EP | 1094281 A2 | 4/2001 |
| GB | 566604 | 7/1943 |
| WO | 0238246 A2 | 5/2002 |
| WO | 2006004540 A1 | 1/2006 |

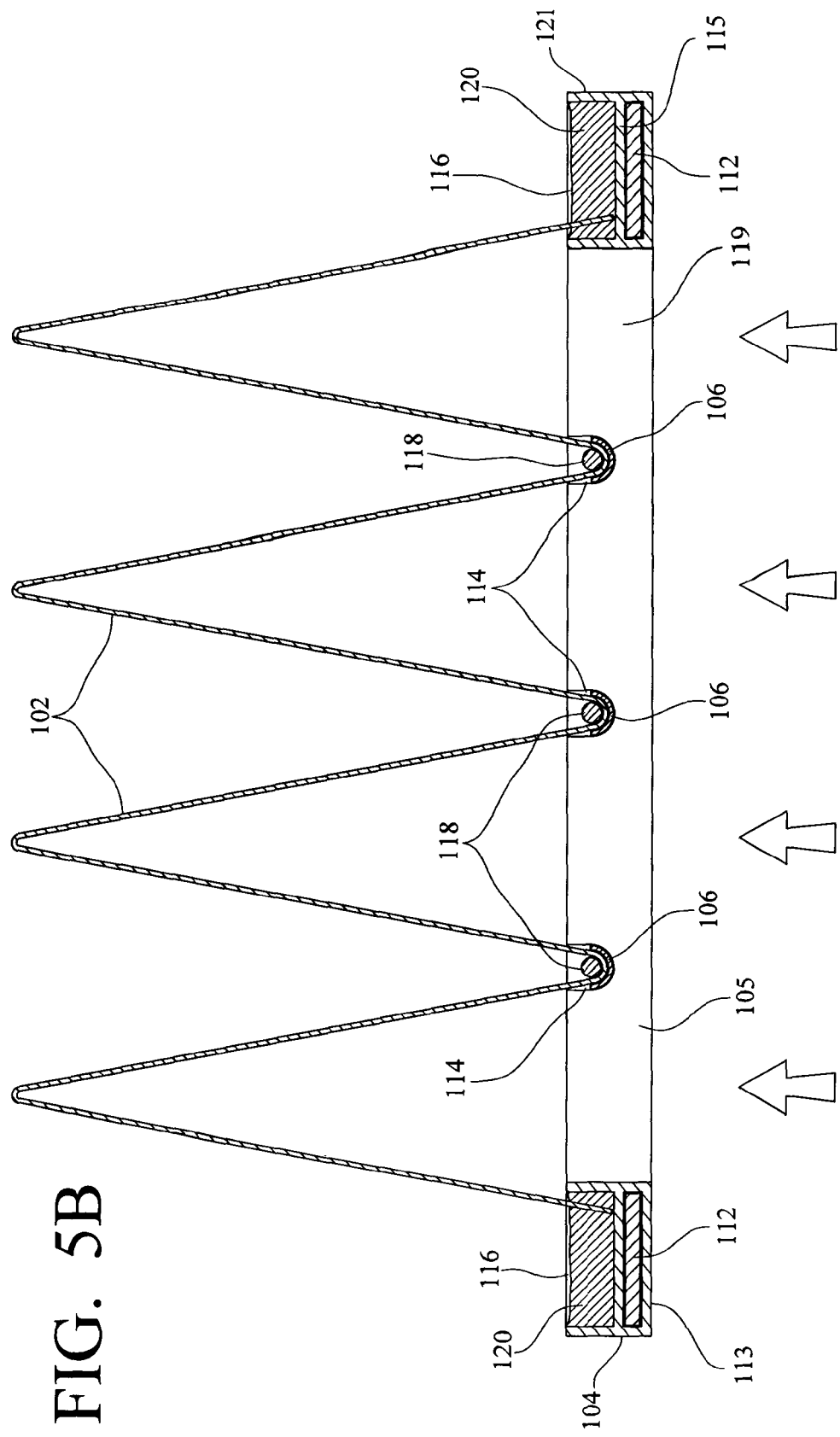

METHOD OF MAKING A MARINE GAS TURBINE FILTER

This continuation claims priority to and benefit from, U.S. patent application Ser. No. 12/100,699, filed on Apr. 10, 2008, issuing as U.S. Pat. No. 7,905,974 on Mar. 15, 2011, which claims priority to and benefit from U.S. Provisional 60/953,088, filed Jul. 31, 2007, the entire contents of which are incorporated herein.

BACKGROUND OF THE INVENTION

1. Field of the Invention

The present invention relates generally to air or gas filter assemblies having pocket shaped filter bags extending from a header.

2. Description of the Related Art

Air and gas cleaning filter assemblies of the type wherein a plurality of elongated tubular flexible filter bags in the form of pockets or bags having open ends attached to a header about apertures in the header is known. The configuration of the pockets causes them to expand by air pressure and extend downstream away from the header in the direction of air flow when in use. This expansion and extension provides increased filter area for a given header area.

In the prior art, these filter elements are typically mechanically attached to the header with clips, rivets, clamps, fasteners, adhesive, to a steel or plastic filter header about apertures therein or snapped between parts of a two part header. Such construction techniques have been found to be expensive and labor intensive. Additionally, air, gas or water being filtered often times leaks about the filter pocket interface with the header, greatly reducing the efficiency of filtration.

SUMMARY OF THE INVENTION

The present invention provides a method for making a pocket filter assembly having a header with at least one aperture wherein the inlet perimeter of a filter element is unitary with the header. Advantageously, the header has a pair of opposing side elements and a pair of end elements forming a rectangular header having a continuous channel in a downstream side thereof for receiving an upstream edge of pocket filter media. The channel having the filter media placed therein is filled with a liquid polymeric material, advantageously polyurethane, that is solidified making the filter media and header unitary. This provides a secure anchor and an air and water tight mounting for the filter media. The invention may be applied to filters wherein individual pocket filter elements are secured to the header or advantageously a continuous sheet of filter media having adjacent pocket filter elements formed therein with seams at outer edges. The method of the present invention provides a filter assembly of the extended area type wherein the open ends of elongated flexible pocket elements are unitary with a header.

BRIEF DESCRIPTION OF THE FIGURES

FIG. 5B is a cross-sectional view of a fully assembled filter panel assembly made by the method of the present invention.

DETAILED DESCRIPTION OF THE PREFERRED EMBODIMENT(S)

Figure 1:
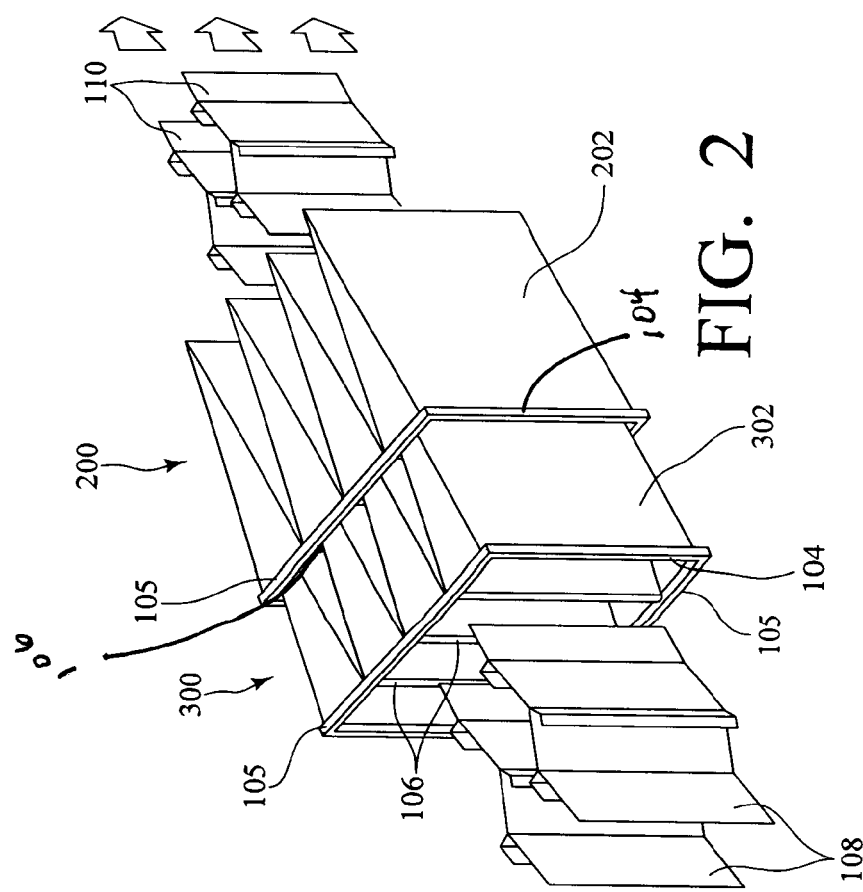
FIG. 1 is a perspective view of a filter panel assembly made according to the method of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

FIG. 1 shows filter panel assembly 100 constructed according to the method of the present invention. Filter panel assembly 100 has filter media 102 with a plurality of pockets formed therein. Advantageously, filter media 102 has the plurality of pockets formed therein from a continuous sheet of porous filtering material with top and bottom edges joined to form the pockets having apices therebetween in a common plane with a header. Such an arrangement may be made by bending or folding the continuous sheet of filtering material to an adjacent side of a pocket element and fixing edges thereto by spot welding or other means as is known in the art. Alternatively, the individual pocket members of filter media 102 may be manufacture individually prior to mounting with the header. This can be achieved by cutting a sheet of filtering material to size. The cut sheet of filtering material is folded in half and the overlapping side edges are stitched or welded together. Advantageously, filter media 102 is comprised of buckram, scrim or any like porous material such as glass fiber or other polymeric material. In an embodiment where filter panel assembly 100 is used in a marine environment, filter media 102 is designed to coalesce high concentrations of water droplets as well as remove particulate material. It is to be understood that the filter panel assembly provided by the steps of making of the present invention may be used to filter any gas or liquid, including but not limited to air and water.

Opposing side header elements 104 and opposing end header elements 105 are joined at corners forming a rectangular header having a continuous outer surface. Side header elements 104 and end header elements 105 may have any length, similar lengths or different lengths, providing a rectangular or square header having any desired dimensions. Advantageously, media cover strips 106 span between opposing end header elements 105 about the apices of filter pockets in media 102 retaining upstream edges between adjacent pockets within a plane of the header formed with header elements 104 and 105. A perimeter portion of filter media 102 is unitary with header elements 104 and 105. Advantageously, header elements 104 and 105 are comprised of a polymeric material and more advantageously are cut to length from a single extruded piece. In a desired embodiment, filter panel assembly 100 is comprised completely of combustible materials so that the assemblies are suitable for incineration.

Figure 2:
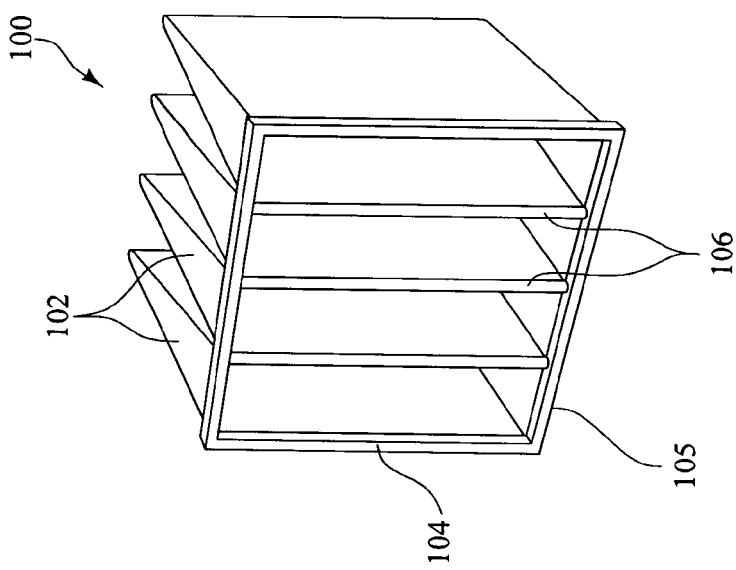
FIG. 2 is perspective view of a plurality of filter panel assemblies constructed according to the method of the present invention showing an application for a marine environment.

FIG. 2 shows a plurality of filter panel assemblies, 200 and 300, suitably arranged in series for usage in a marine environment. The multistage system includes a plurality of first mist eliminators 108. Mist eliminators 108 are inertial devices having high capacity drainage for removing water droplets from intake air. Intake air passes from mist eliminators 108 to prefilter 300. Prefilter 300 has filter media 302 with a plurality of pockets formed therein. Advantageously, filter media 302 is comprised of high permeability and low pressure drop filtering material and is designed to coalesce high concentrations of water droplets. Opposing side header elements 104 and opposing end header elements 105 are joined at corners forming a rectangular header having an inlet portion of filter media 302 unitary therewith. Advantageously, media cover strips 106 span between opposing end header elements 105 about the apices of filter pockets in filter media 302 retaining upstream edges between adjacent pockets within a plane of the header formed with header elements 104 and 105. Following prefilter 300 is high specification filter 200 having filter media 202 with a plurality of pockets formed therein. Advantageously, filter media 202 is of a higher efficiency than filter media 302 and likewise is advantageously designed to coalesce high concentrations of water droplets. Opposing side header elements 104 and opposing end header elements 105 are joined at corners forming a rectangular header having an inlet portion of filter media 202 unitary therewith. Advantageously, media cover strips 106 span between opposing end header elements 105 about the apices of the pockets within filter media 202 retaining upstream edges between adjacent pockets 302 within a plane of the header formed with header elements 104 and 105. Mist eliminators 110 are inertial devices having high capacity drainage for removing water droplets from air exiting specification filter 200 providing intake air for devices such as a marine gas turbine. Due to the varying size requirements in air filtration systems, several panels may be positioned together, side by side, in a bank providing parallel filtration. This may be accomplished by placing the two or more filter panel assemblies 200 or 300 side by side. The adjacent edges of side header elements 104 and/or opposing end header elements 105 may be sealed with a suitable sealing compound to prevent air leakage between a bank of filter panel elements providing parallel filtration.

Figure 3:
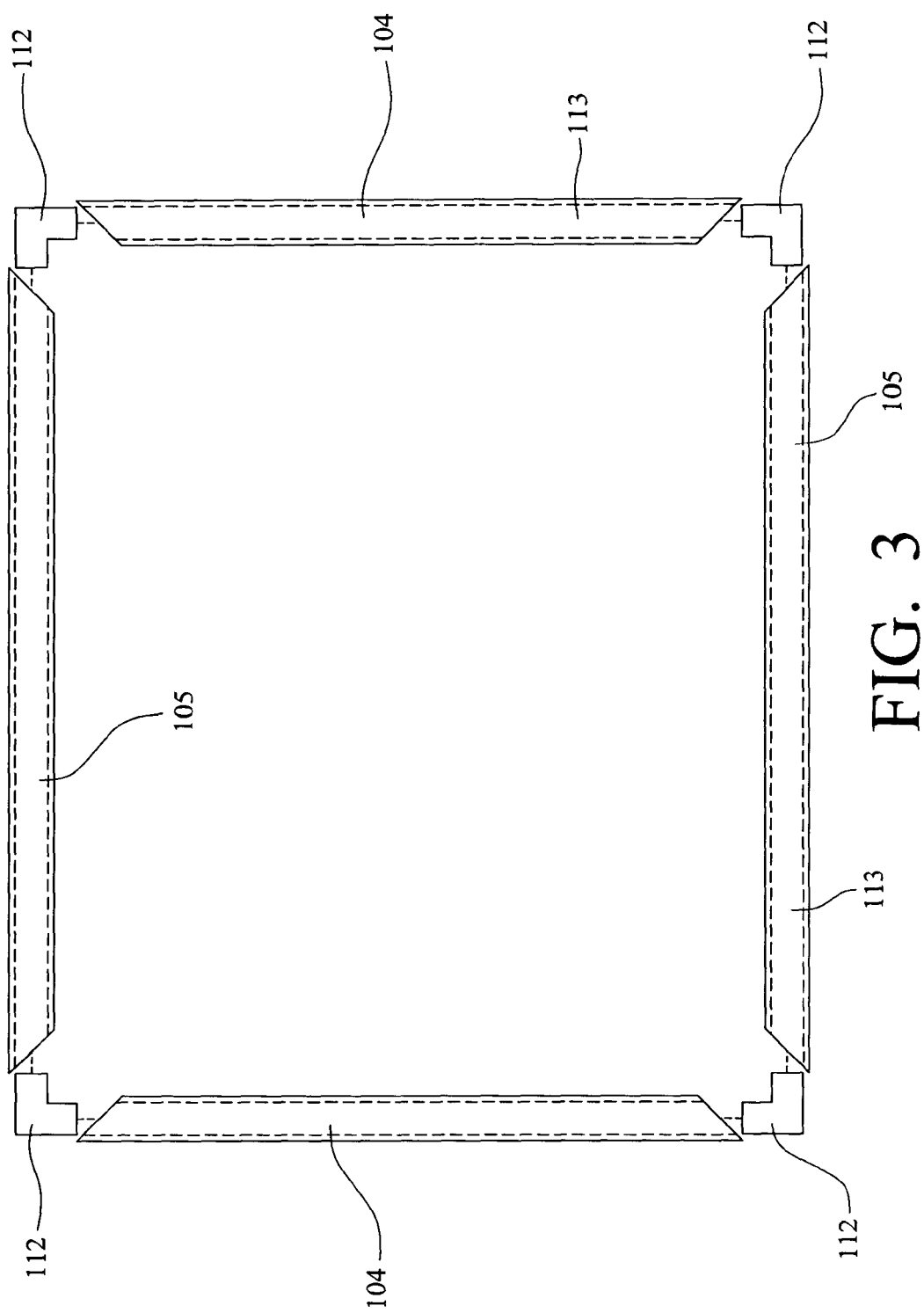
FIG. 3 is an exploded view of a header showing a method of assembly.

FIG. 3 shows a method of assembly of a header. Opposing side header elements 104 and opposing end header elements 105 are joined at corners forming a rectangular header having a continuous outer surface. Advantageously, header elements 104 and 105 are comprised of a polymeric material and more advantageously are miter cut at approximately 45° to length from a single extruded piece. More advantageously, each header element, 104 and 105, have a longitudinally extending rectangular cavity (formed with cross-members 115, shown in FIGS. 5A and 5B) suitable for closely receiving ends of "L" clips 112. The method of making a header comprises first extruding a continuous length of header material. The extruded header material is then miter cut at approximately 45° to desired lengths of side elements 104 and end elements 105. "L" clips 112 are then provided and a first end of "L" clip 112 is placed and securely fastened into a rectangular cavity of either a side element 104 or an end element 105 and the other end of "L" clip 112 is placed and securely fastened in the cavity of the other of a side element 104 or end element 105. This arrangement increases the tendency of the header to retain 90° corners and improves the strength thereof.

Figure 4:
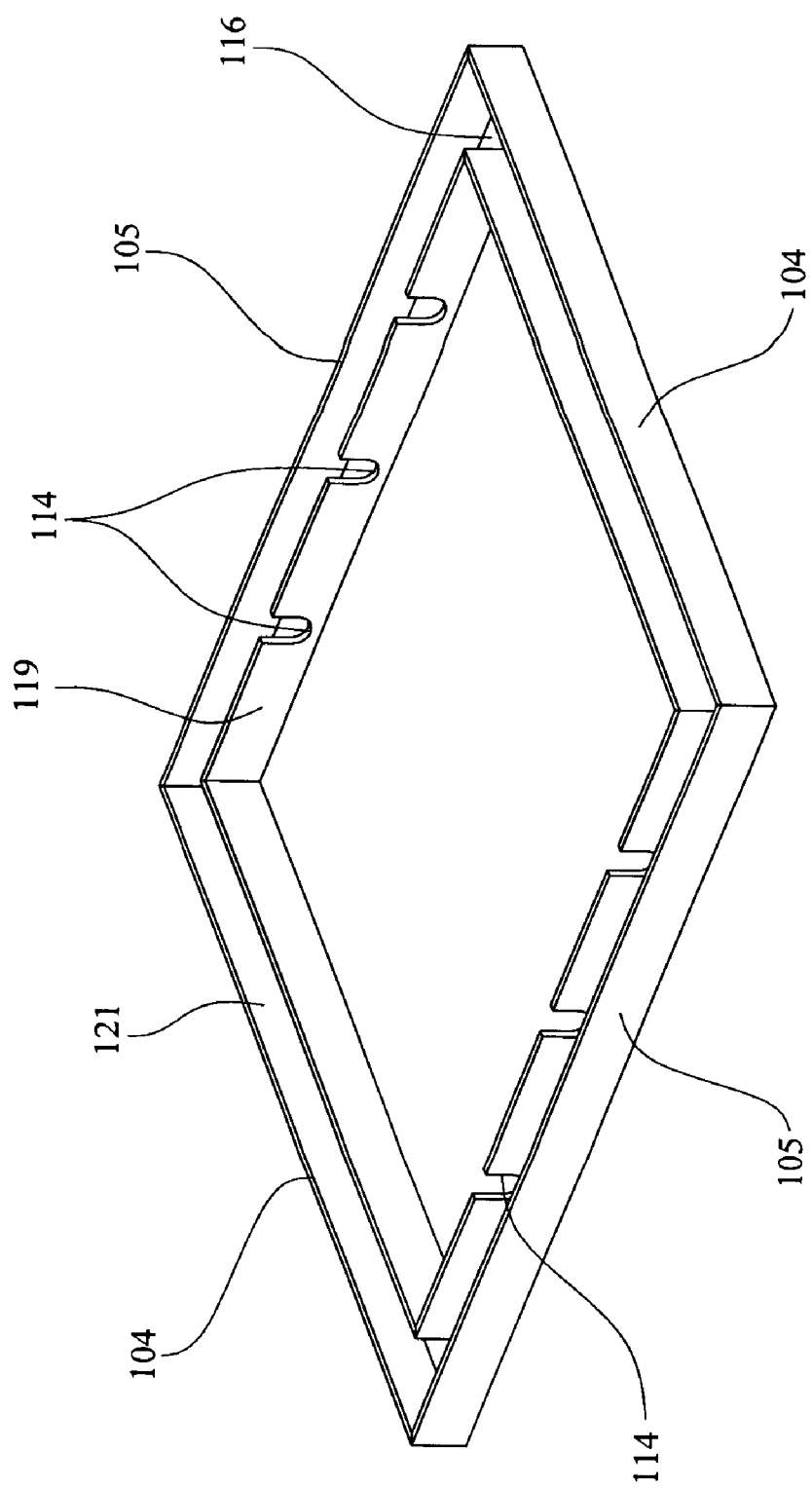
FIG. 4 is a perspective view of an embodiment of an assembled header showing a continuous channel for receiving an upstream portion of a filter media.

FIG. 4 shows an assembled header positioned to receive filter media 102. Opposing side header elements 104 and opposing end header elements 105 are joined at corners, as shown in FIG. 3, forming a rectangular header having a continuous outer surface. The continuous outer surface has an inner wall 119 and an outer wall 121 with a channel 116 circumscribing the downstream side of the header for filter media mounting purposes. The inner walls 119 of end header elements 105 advantageously have a plurality of substantially equal spaced recesses 114 for receiving stiffening rods, media cover strips, and/or a portion of filter media.

Figure 5A:
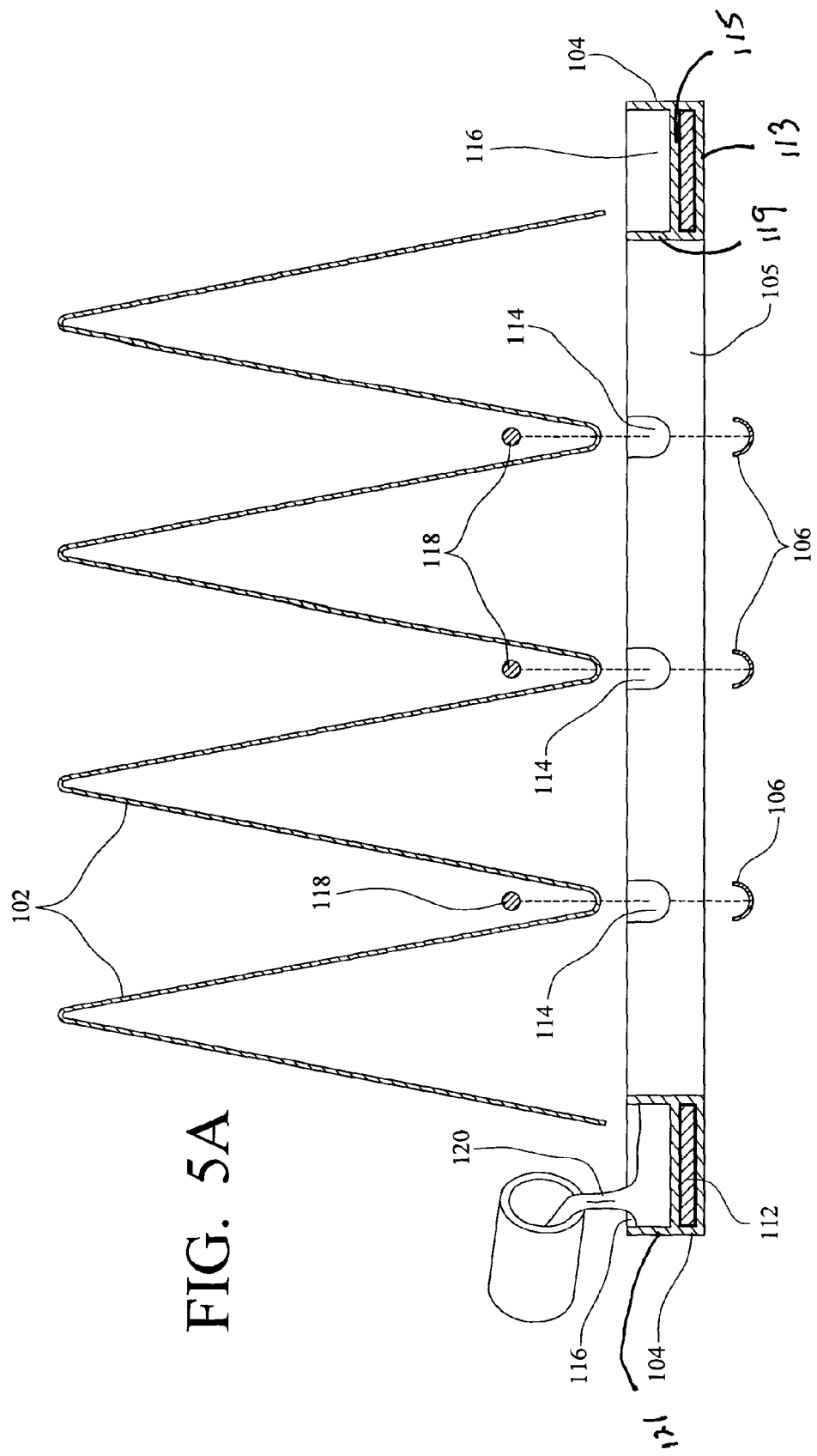
FIG. 5A is a cross-sectional exploded view of a filter panel assembly showing a method of making in accordance with one embodiment of the present invention.

FIG. 5A shows a method of making pocket filter assembly 100. Two opposing side header elements 104 and two opposing end header elements 105 were joined at corners by the method shown in FIG. 3 forming a rectangular header having a continuous channel 116 circumscribing the downstream side of the header. Channel 116 has an inner wall 119 and an outer wall 121 and a lower wall comprising cross-member 115. Cross-member 115 longitudinally extends between each pair of longitudinally extending inner and outer walls 119 and 121 substantially parallel with longitudinally extending bottom wall 113 forming a cavity longitudinally extending below channel 116. "L" shaped brackets 112 are inserted and secured into the rectangular cavities of adjacent side and end header elements 104 and 105. An upstream perimeter portion of pocket filter media 102 is inserted into channel 116 between inner and outer side walls 119 and 121 of the header proximate cross-member 115. Outer corners of apices of the pockets of pocket filter media 102 are placed proximate substantially equal spaced recesses 114. Media cover strips 106 are advantageously placed about the apices of the pockets of pocket filter media 102 and extend between opposing recesses 114 in opposite inner side walls 119 of header end elements 105. Media cover strips 106 are optional and are designed with a smooth rounded upstream surface such as to decrease a pressure drop across the filter assembly by reducing resistance to air flow. Additionally, media cover strips 106 in conjunction with stiffening rods 118 increase the strength of the pocket holding arrangement in the header. Stiffening rods 118 are placed into recesses 114 adjacent a downstream surface of filter media 102 proximate each apex and each media cover strip 106. Advantageously, stiffening rods 118 extend into channel 116 through recesses 114. Stiffening rods 118 may be comprised metallic materials but are advantageously polymeric. A liquid polymeric material 120 is then placed into channel 116 and is solidified. Advantageously, polymeric material 120 is polyurethane but may be any material that upon solidification becomes unitary with filter media 102, side header elements 104, and end header elements 105. For example, polymeric material 120 may be a thermosetting liquid resin or a two part resin. For example, a polyvinyl chloride resin dispersed in a liquid plasticizer may be used.

FIG. 5B shows a cross-sectional view of a fully assembled filter panel assembly having been assembled by the method of the present invention. Two opposing side header elements 104 and opposing end header elements 105 were joined at corners with "L" shaped brackets 112 forming a rectangular header. Continuous channel 116 circumscribing the downstream side of the header has been substantially filled with a polymeric material 120 and has hardened making side header elements 104, opposing end header elements 105, and an upstream perimeter portion of pocket filter media 102 unitary. Cross-members 115 are shown longitudinally extending between each pair of longitudinally extending inner and outer walls 119 and 121 substantially parallel with longitudinally extending bottom wall 113 forming a rectangular cavity. "L" shaped brackets 112 are secured into the rectangular cavities of adjacent side and end header elements 104 and 105. An upstream perimeter portion of pocket filter media 102 is unitary with the header between inner and outer side walls 119 and 121. The unitary design of the present invention prevents air leakage and water by-pass at the media to header interface. Outer corners of apices of the pockets of pocket filter media 102 are proximate each recess 114. Media cover strips 106 are about the upstream side of apices of the pockets of pocket filter media 102 and extend between opposing recesses 114. Stiffening rods 118 are extend into recesses 114 adjacent a downstream surface of filter media 102 proximate each media cover strip 106. Arrows show the direction of flow of air or other gases to be filtered and designate the upstream side of the filter assembly. The air flow causes the pockets to extend toward the downstream side of the filter media as shown.

The unsupported filter media 102 may be collapse folded over against the header providing a substantially flat package which facilitates storage, handling, and shipping. In use, upon installation of the filter in a suitable ventilating or air conditioning system with the free ends of the pockets of filter media extending in the direction of the air stream away from the header the force of the air flow expands the pockets to their full length into a substantially straight horizontal position as shown in the figures.

While the present invention has been shown and described herein in what are considered to be the preferred embodiments thereof, the invention is not limited to those specific embodiments. Thus, the forms of the invention shown and described herein are to be taken as illustrative only and other embodiments may be selected without departing from the scope of the present invention, as set forth in the claims appended hereto.

The invention claimed is:

1. A method for making a pocket filter assembly comprising:
    providing two side and two end header elements wherein each header element has a pair of longitudinally extending side walls and a longitudinally extending bottom wall forming a longitudinally extending channel;
    joining each of said header elements together at ends forming a rectangular header with two opposing sides and two opposing ends wherein said bottom walls and said side walls of each of said opposing sides and said bottom walls and said side walls of each of said opposing ends become adjacent forming a rectangular header with a continuous bottom wall and continuous inner and outer side walls, the downstream side of said header having a continuous channel;
    inserting an upstream perimeter portion of a filter element between said inner and outer side walls of said header in said channel, said filter element having a plurality of pockets;
    placing a liquid polymeric material between said inner and outer side walls of said header; and
    solidifying said liquid polymeric material forming a header frame having said upstream perimeter portion of said filter element unitary therewith.

2. The method for making a pocket filter assembly of claim 1 wherein said header elements have a cross-member longitudinally extending between said pair of longitudinally extending side walls substantially parallel with said longitudinally extending bottom wall forming a cavity longitudinally extending below said channel.

3. The method for making a pocket filter assembly of claim 2 wherein said joining step includes insertion of "L" shaped brackets into said rectangular cavities of adjacent side and end header elements.

4. The method for making a pocket filter assembly of claim 1 wherein said step of providing two side and two end header elements is preceded with a step of extruding side and end header elements.

5. The method for making a pocket filter assembly of claim 1 wherein said step of providing two side and two end header elements is preceded with a step of miter cutting the ends of said side and end header elements at approximately 45°.

6. The method for making a pocket filter assembly of claim 1 wherein said liquid polymeric material is polyurethane.

7. The method for making a pocket filter assembly of claim 1 wherein said end walls have a plurality of substantially equal spaced recesses in said inner side walls of said header, said step of inserting an upstream perimeter portion of a filter element between said inner and outer side walls of said header being preceded by a step of placing media cover strips extending between opposing recesses in opposite inner side walls.

8. The method for making a pocket filter assembly of claim 7 wherein said step of inserting an upstream perimeter portion of a filter element between said inner and outer side walls of said header further comprises placing apices of said pockets of said filter element into said cover strips and followed by a step of placing stiffening rods into said recesses adjacent a downstream surface of said filter media and proximate each of said media cover strips.

9. A method for making a pocket filter assembly comprising:
    providing a pair of header end elements and a pair of header side elements, said header end elements and said header side elements each having longitudinally extending side walls, a longitudinally extending cross-member extending between and substantially normal with said side walls forming a channel thereabove, and a longitudinally extending bottom wall joining lower edges of said side walls below and substantially parallel with said cross-member forming a cavity thereabove, each end of said header elements having said bottom wall and said cross-member angle at approximately 45°;
    inserting and securing one end of an "L" shaped clip into said cavity in each end of said header end elements or said header side elements;
    inserting and securing the other end of said "L" shaped clip into the other of said header end elements or said header side elements to form a rectangular header;
    inserting an upstream perimeter portion of a filter element into said channel, said filter element having a plurality of pockets forming said pocket filter assembly;
    placing a liquid polymeric material into said channel; and
    solidifying said liquid polymeric material forming a header having said upstream perimeter portion of said filter element unitary therewith.

10. The method for making a pocket filter assembly of claim 9 wherein said liquid polymeric material is polyurethane.

11. The method for making a pocket filter assembly of claim 9 wherein said header end elements have a plurality of substantially equal spaced recesses in an inner side wall, said step of inserting an upstream perimeter portion of a filter element between said inner and outer side walls of said header being followed by a step of placing stiffening rods into said recesses adjacent a downstream surface of said filter media proximate an apex between each of said pockets.

12. The method for making a pocket filter assembly of claim 11 wherein ends of said stiffening rods extend into said channel and become unitary with said header.

13. The method for making a pocket filter assembly of claim 11 further comprising a step of placing said apices of said pockets of said filter element into cover strips adjacent a downstream surface thereof proximate each of said stiffening rods.

14. The method for making a pocket filter assembly of claim 13 wherein said cover strips have a rounded downstream surface.

* * * * *